United States Patent [19]

Nakamura

[11] Patent Number: 5,019,935
[45] Date of Patent: May 28, 1991

[54] PROTECTION CIRCUIT FOR ELECTRICAL APPLIANCE

[76] Inventor: Ikuro Nakamura, Flat A3,14/F, 6 Dragon Terrace, North Point, Hong Kong

[21] Appl. No.: 506,322

[22] Filed: Apr. 6, 1990

[51] Int. Cl.$^5$ ............................................... H02H 3/28
[52] U.S. Cl. ........................................ 361/45; 361/49
[58] Field of Search ............................. 361/42, 45, 50

[56] References Cited

U.S. PATENT DOCUMENTS 3,891,895  6/1975  Wittlinger ............................ 361/45

Primary Examiner—Todd E. DeBoer
Attorney, Agent, or Firm—Moonray Kojima

[57] ABSTRACT

A protection device for an electric appliance comprising a differential transformer comprising a magnetic core disposed around a pair of wires leading to the appliance from the source and a sensing wire thereon; a solenoid driven switch for cutting off the source in response to a leakage current in the wires; an SCR which is normally non-conducting for connecting the solenoid to the source in the conducting state so as to cause the switch to be in a cut-off state; a voltage regulator for supplying suitable regulated voltage to an amplifier and a latched-trigger circuit; an amplifier connected to the sensing wires for providing a signal to the latched-trigger circuit; and a latched-trigger circuit for taking the signal from the amplifier and in response thereto provide a trigger signal to cause the SCR to be in a conducting state so as to operate the solenoid and cut-off switch. Advantageously, a Zener diode is provided at one input terminal of the amplifier to provide a threshold level for the differential current detected by the sensing winding to operate the amplifier. By simply adjusting the value of the Zener diode, the threshold level can be simply adjusted. Advantageously, the invention is simple, inexpensive, and reliable.

1 Claim, 2 Drawing Sheets

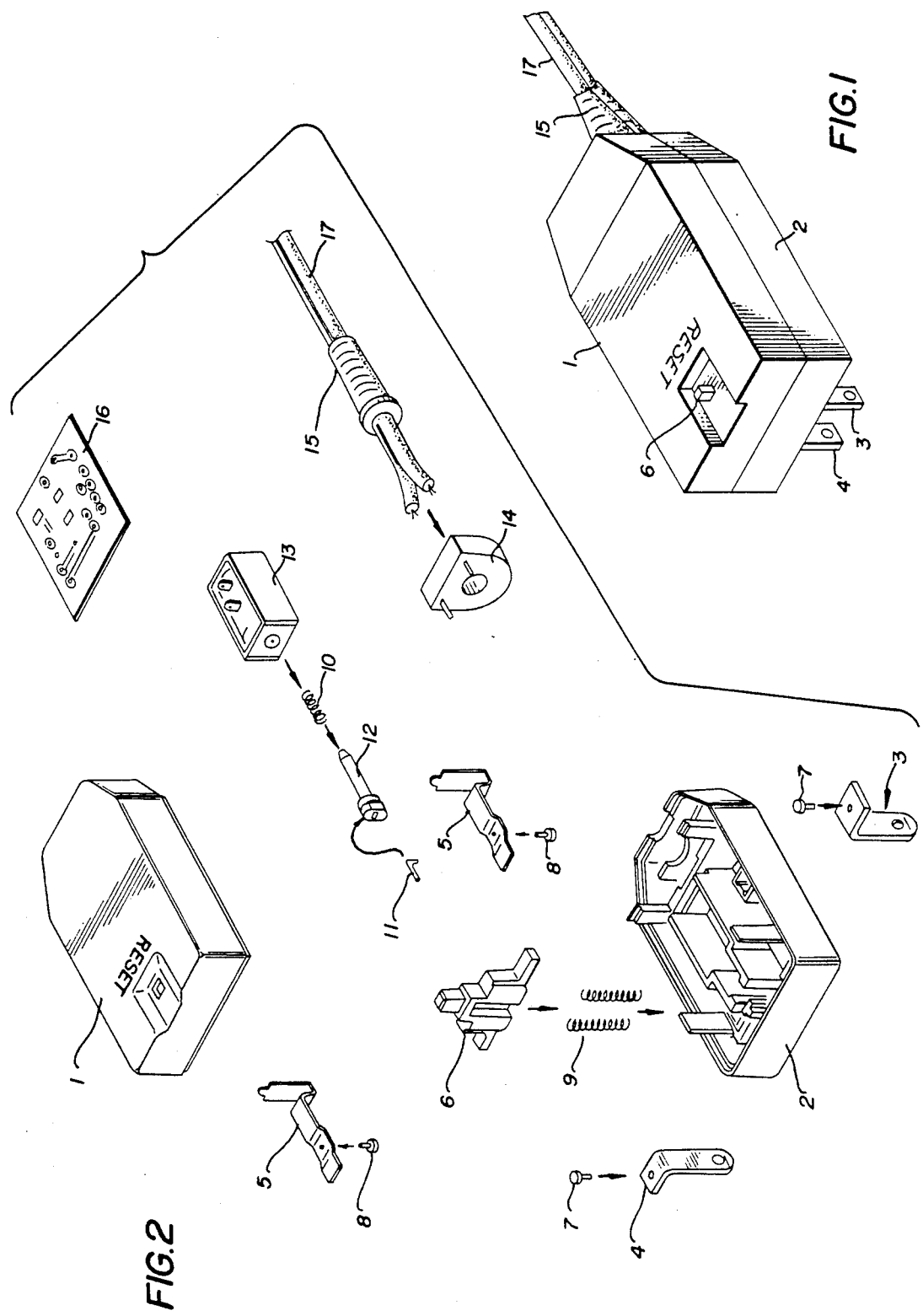

5,019,935

PROTECTION CIRCUIT FOR ELECTRICAL APPLIANCE

BACKGROUND OF THE INVENTION

1. Field of Invention.

This invention relates to electrical protection circuits such as those used to remove line voltage from an appliance when a fault occurs in the appliance; and more particularly, to an improved circuit using a differential transformer to detect differential current changes in the line.

2. Discussion of the Prior Art.

Prior art electrical protection circuits have generally used either a third line to detect a fault or a differential transformer The third line type is not very practical since it requires added components in the appliance itself The differential transformer type has many variations, but, they all leave something to be desired. The art has a crying need for a simple, inexpensive and reliable protection circuit.

SUMMARY OF THE INVENTION

Accordingly, an object of the invention is to simplify electrical protection circuits, reduce expense of manufacture, and extend usage of such protection circuits without requiring changes in appliance, The foregoing and other objects, features and advantages of the invention are attained in an electrical protection circuit which utilizes a differential transformer comprising a toroidal core having a hole therein through which a pair of wires connecting the appliance to the source are passed and a sensing winding on the core for detecting differential current between the two wires; a solenoid driving switch for cutting off the wires to the appliance from the source when a fault occurs in the appliance as indicated by differential current in the sensing winding; an SCR which is normally non-operated but which is operated when the fault is detected; a voltage regulator to provide proper regulated voltage to an amplifier and a latch-trigger circuit; an amplifier connected to the sensing winding to provide a control signal to the latchtrigger circuit; a latch-trigger circuit for taking the control signal from the amplifier and in response thereto provide a trigger signal to the SCR to cause it to become conductive and thereby energize the solenoid and cause the wires to the appliance to be cut-off from the source. A Zener diode is connected to the amplifier to provide a threshold level above which a signal detected by the sensing wire of the differential transformer will be applied to the amplifier for amplification. Advantageously, the Zener diode arrangement can be simply adjusted to adjust the threshold level and thereby prevent false faults from triggern the SCR Also, advantageously, the entire arrangement of the invention is simple, can be produced from simple off-the-shelf components, and is inexpensive, and reliable.

BRIEF DESCRIPTION OF THE DRAWINGS.

FIG. 1 is a perspective view of the outer structure of the device embodying the protection circuit of the invention.

FIG. 2 is an exploded view of the device of FIG. 1, showing the interior elements thereof.

Figure 3:
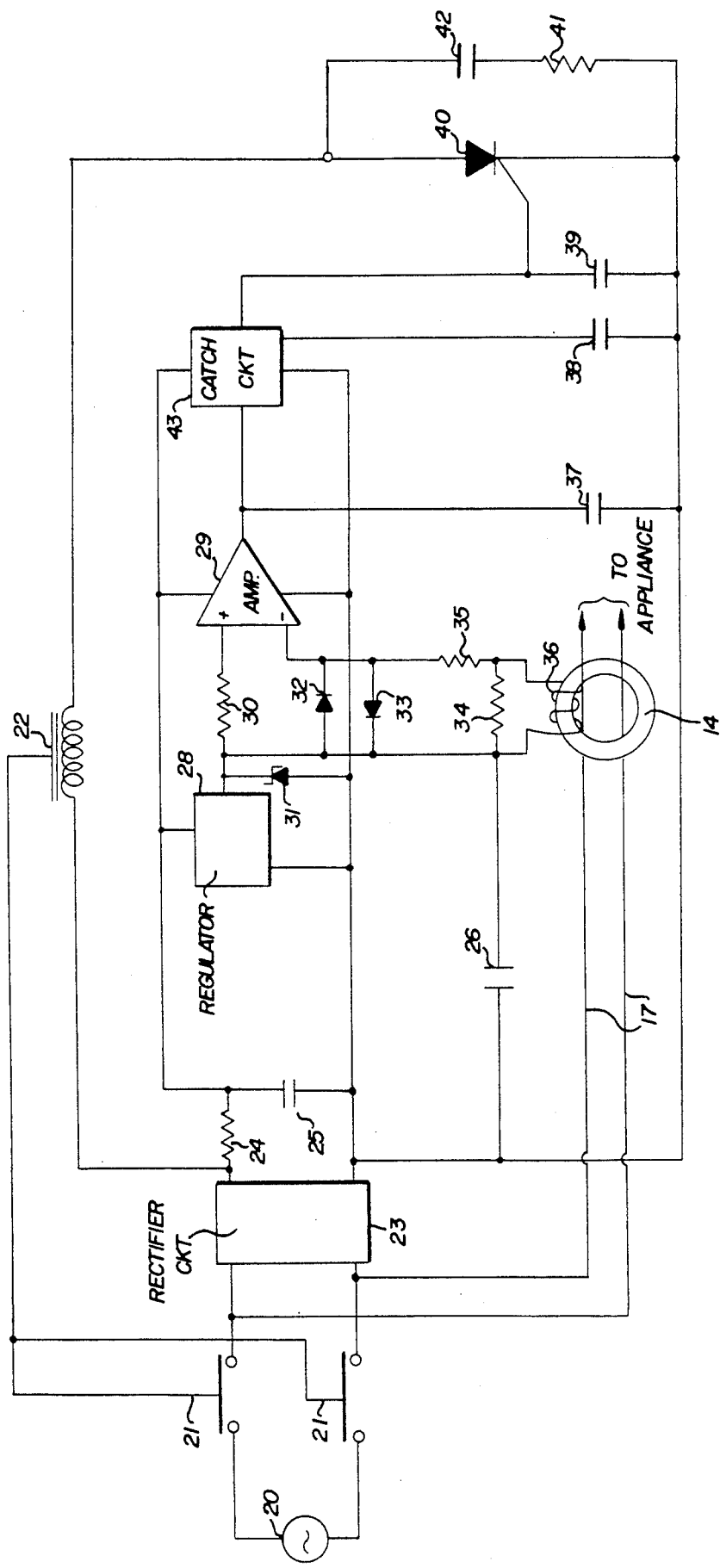
FIG. 3 is a circuit diagram depicting an illustrative embodiment of the invention embodying the circuit

DETAILED DESCRIPTION OF THE PREFERRED EMBODIMENTS.

Turning now to FIG. 1, the protective device of the invention may be advantageously embodied at the plug end of the cord, such as shown in FIG. 1. The cord 17 may be attached to, for example, a hand held hair dryer. The device comprises an upper body 1, a lower body 2, which may be snap fitted together for easy and rapid assembly. The bodies 1, 2 may be formed of a plastic material, such as by molding, with the various compartments shown therein. A reset button 6 is provided at the top of body 1 and is used to reset the switch provided in the device, as will be explained later, after a fault has been corrected. Through the bottom of the lower body 2 protrude two prongs 3, 4 for fitting into a source outlet. At the other end, line 17 extends outwardly with a flexible plastic bushing 15 holding the wires flexibly within upper and lower bodies 1, 2, as depicted.

In the exploded view of FIG. 2, there are depicted, upper and lower bodies 1, 2, prongs 3, 4, reset button 6, wires 17, and bushing 15, as discussed above in the arrangement shown. In addition, provided within the two bodies 1, 2 are screws 7 for connecting the prongs to the lower body 2, a magnetic differential transformer 14 comprising a generally toroidal shaped core and a winding thereon with wires 17 passed through a hole in the toroidal core and connected to the prongs 3, 4 through the switch blades 5, which are attached by screws 8 to the bottom portion of the reset button structure 6 so that the movement up and down of the reset button will move the switch blades 5 Reset structure 6 is supplied with a pair of springs 9 so as to be in an up position when the switch is open and in a down position when the switch is closed The reset and switch blade arrangement can be reversed in operative modes as desired, that is, the button may be normally down when the switch is open and up when the switch is closed. The blades 5 are operated by the solenoid arrangement comprising solenoid 13, spring 10, shaft 12 and hook 11. When solenoid 13 is energized, it will pull in shaft 12 against spring force of spring 10, and cause hook 11 to lift blades 5 to open the blades from contact with the prongs 3, 4. After the blades open the circuit, the reset button will come up. No line current will travel to the appliance and the appliance will then be in a non-operative side. After the fault is corrected, the operator merely pushes the reset button in for reoperation of the appliance.

The solenoid and sensing device are operated by electrical circuitry disposed , for example, on circuit board 16 of FIG. 2. Such circuitry is depicted more fully in FIG. 3.

Turning now to FIG. 3, an electrical circuit is depicted for operating solenoid 22 which operates such 21, using an SCR 40 which when caused to be in an operated state connect the source to the solenoid 22, in response to a fault in an electrical appliance (not shown) as reflected in changes of differential currents through the pair of lines 17, as detected by sensing coil 36 on toroidal core 14 of the differential transformer. The circuit comprises a rectifier circuit 23 which changes the AC to DC and smoothing filter circuit comprising resistor 24 and capacitor 25. Connected to the rectified DC line is a voltage regulator 28, which is an off-the-shelf component, and which provides regulated voltage of suitable values to operational amplifier 29 and latch-trigger circuit 43.

The sensing winding 36 on core 14 is connected via resistors 34, 35 and reverse headed diodes 32, 33 to the input terminals of amplifier 29 through resistor 30. The diodes 32, 33 act to clamp noise from the transformer in either direction, Thus, a signal representing the fault induced differential current will be applied to an amplified by amplifier 29. Capacitors 26, 37, 38 and 39 provide the desired voltage levels to the connections shown, An amplified signal from the amplifier is then applied to the latched-trigger circuit 43. In response to the amplified signal applied to the latchedtrigger circuit 43, the latched-trigger circuit provides a control or trigger signal to SCR 40 to cause it to be in an operative state. The resistor 41, and capacitors 42, 39 act to suppress transient noises. Capacitor 37 acts as an integrating capacitor and prevents undesired levels of voltage at the latched-trigger circuit 43.

With the SCR becoming operated, a circuit is completed comprising the line, solenoid 22, and through SCR 40, so that the solenoid 22 is energized by the line current, to cause switch 21 to be opened, and to disconnect the appliance from the source.

In the FIG. 3 circuit, a Zener diode 37 is connected to one of the input terminals of the operational amplifier 29 so as to provide a threshold level above which the differential current sensed by winding 36 will be amplified by the amplifier 29, and thus prevent false faults from triggering the SCF and cutting off the current to the appliance Advantageously, the value of the Zener may be adjusted to suit the values of differential current desired.

The latched-trigger circuit is of a known type, and can be obtained off-the-shelf. One example of such a circuit is shown in USP 4,216,515, wherein once a signal, which may be of short duration, from amplifier 29 operates a transistor in the latchedtrigger circuit, a capacitor clamps the transistor to operate so that the trigger signal will be sufficient to operate the SCR 40. This latch type trigger is needed because the signal obtained by differences in current in the line to the appliance may be toward the end of an AC cycle and not be of sufficient duration, without the latching to operate the SCR.

Advantageously, the protection circuit is simple and can be manufactured using off-the-shelf components. The rectifier circuit 23, the voltage regulator 28, operational amplifier 29, and the latched-trigger circuit 43, are all known and can be purchase as simple chips. Thus, the entire arrangement is inexpensive, Also, a simple Zener didde can be used to control the amount of differential current detected to trigger the SCR.

What is claimed is:

1. A protection device for electrical appliance with a pair of wires connecting the electrical appliance with a source; said device comprising a bridge rectifier circuit for converting the source from AC to DC;

a differential transformer comprising a generally toroidal magnetic core having a hole therein through which said pair of wires is passed, and a winding having two ends and disposed on said toroidal core;

a resistor;

a pair of oppositely biased diodes connected across said two ends of said differential transformer;

switching means comprising a solenoid and a switch driven by said solenoid, for connecting and disconnecting said source to said pair of wires connected to said electrical appliance;

an SCR device having a normally non-operated state and an operated state for connecting said source to said solenoid to cause said switch to disconnect said source from said electrical appliance;

a voltage regulator having three terminals and connected to said bridge rectifier circuit for providing regulated voltage to an amplifier and a latched trigger circuit;

an amplifier for amplifying a signal from said winding of said differential transformer representing differential current between the pair of wires and for producing an output signal in response thereto; said amplifier comprising a pair of potential terminals and a pair of input terminals, another of said pair of input terminals being connected to one of said two ends of said winding of said differential transformer and one of said pair of input terminals being connected to said resistor, two of said three terminals of said voltage regulator being connected to said pair of potential terminals of said amplifier, and another of said three terminals of said voltage regulator being connected to said resistor and therethrough to one of said input terminals of said amplifier;

a Zener diode having one terminal directly connected to said resistor and therethrough to said one of said input terminals of said amplifier, and another terminal directly connected to one of said potential terminals of said amplifier, for controlling the threshold level of current detected by the differential transformer and applied to the amplifier so that flase faults do not trigger the SCR; and a latched-trigger means responsive to the signal from said amplifier for generating a trigger signal and for applying the trigger signal to the SCR to cause said SCR to be in an operating state so that in response to leakage current in the electrical appliance, the differential current through the pair of wires is detected by the windings of the differential transformer and applied to the amplifier and then to cause the latch-trigger means to generate and apply the trigger signal to the SCR and cause the SCR to energize the solenoid and thereby cause the switch to disconnect the wire leading to the electrical appliance from the source.

* * * * *